United States Patent [19]
Shiotani et al.

[11] Patent Number: 5,146,826
[45] Date of Patent: Sep. 15, 1992

[54] CIRCULAR SAW DEVICE HAVING VARIABLE CUT-OFF ANGLE

[75] Inventors: Takeshi Shiotani; Kouichi Miyamoto, both of Tokyo, Japan

[73] Assignee: Ryobi Ltd., Hiroshima, Japan

[21] Appl. No.: 627,096

[22] Filed: Dec. 13, 1990

[30] Foreign Application Priority Data

Jan. 13, 1990 [JP] Japan .................. 2-2007[U]

[51] Int. Cl.⁵ .............................................. C26D 1/16
[52] U.S. Cl. ..................................... 83/468.2; 83/397; 83/471.3; 83/473; 83/581; 269/303
[58] Field of Search ............. 83/581, 471.3, 472, 83/473, 397, 468.3, 468.2, 468.7, 438; 269/303, 304, 315, 900, 99, 100

[56] References Cited

U.S. PATENT DOCUMENTS

| | | | |
|---|---|---|---|
| 2,524,344 | 10/1950 | English | 83/468.7 |
| 3,331,406 | 7/1967 | Christophel | 83/471.3 |
| 4,265,154 | 5/1981 | Batson | 83/581 X |
| 4,669,348 | 6/1987 | Holder | 83/581 X |
| 4,934,233 | 6/1990 | Brundage | 83/468.7 X |

Primary Examiner—Frank T. Yost
Assistant Examiner—Rinaldi Rada
Attorney, Agent, or Firm—Sughrue, Mion, Zinn Macpeak & Seas

[57] ABSTRACT

A circular saw device having a variable cut-off angle includes a rotary table provided on a base, and a rotatable circular saw mounted on the rotary table to be movable upwardly and downwardly. A locator is provided on the base and has a curved front central portion concave backwards so that the locator does not interfere with the saw. The locator is movable between a first and a second position depending upon the cross-sectional size of the workpiece to be cut by the saw. The locator is placed in a first position when the workpiece has a small cross-sectional size and in a second position when the workpiece has a large cross-sectional size. Fitted members are provided in the bottom of the locator and are irremovably fitted in guide holes of the base so that the members are slidable in the holes to move the locator from the first to the second position. Pins are provided in the locator and are removably fitted in the small holes of the base to place the locator in the first or the second position.

31 Claims, 4 Drawing Sheets

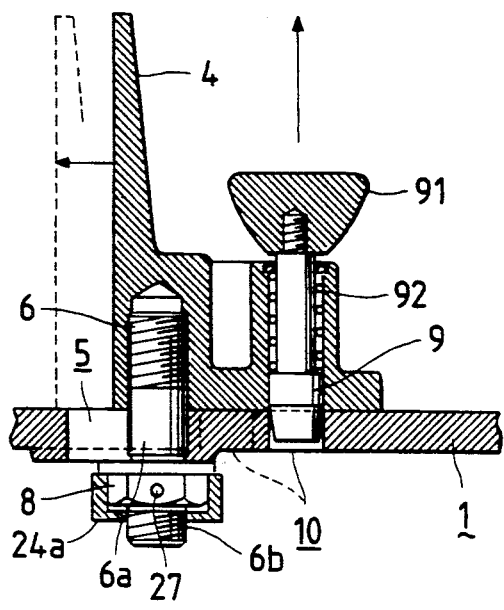
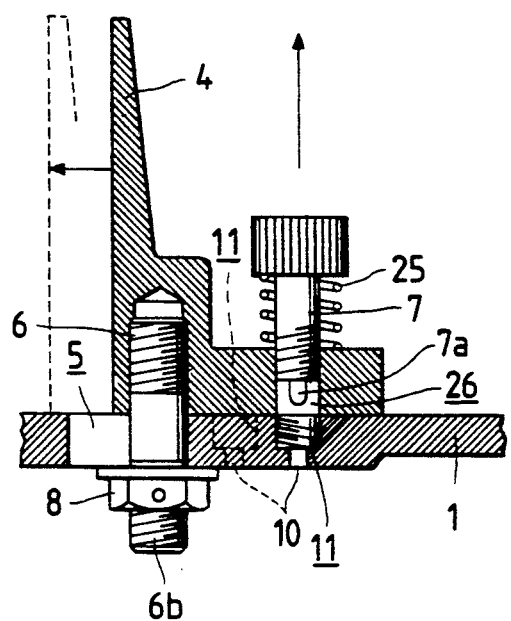
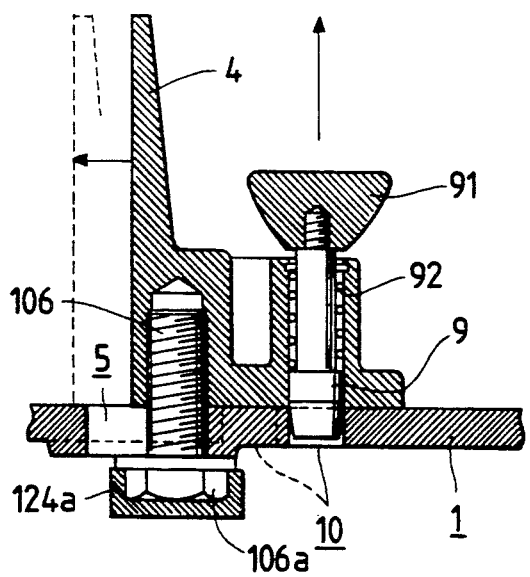

CIRCULAR SAW DEVICE HAVING VARIABLE CUT-OFF ANGLE

BACKGROUND OF THE INVENTION

The present invention relates to a circular saw device having a variable cut-off angle for a miter joint or the like, and more particularly to a circular saw device having a variable cut-off angle and a locator which can be moved to widen the cut-off range of the circular saw, thereby to increase the cut-off capability of the device.

In conventional circular saw devices having a variable cut-off angle, an auxiliary plate is fitted on a locator or removed increase the device's cutting capability. When a workpiece having a large cross-section is to be cut by the device, the workpiece is secured on a base so as to tightly contact the locator. When a workpiece having a small cross-section is to be cut by the device, the auxiliary plate having a prescribed thickness is fitted on the locator and the workpiece is secured on the base so as to tightly contact the auxiliary plate. Thus, the device requires the auxiliary plate as an accessory component to operate efficiently. Moreover, the auxiliary plate requires that the operator of the device manufacture the auxiliary plate from appropriate lumber with an electric planer and fit the plate onto the locator with screws or remove the screws to detach the plate therefrom.

In another conventional circular saw device having a variable cut-off angle, such an auxiliary plate is not required. Instead, a locator is moved to widen the cut-off range of the circular saw, thereby to increase the device's cut-off capability. When a workpiece having a large cross-section is to be cut the locator is secured by bolts, nuts and the bolt holes of right and left rear portions of a base, and the workpiece is secured onto the base so as to tightly contact the locator. When a workpiece having a small cross-section is to be cut by the device, the locator is secured by the bolts, the nuts and the bolt holes of right and left front portions of the base and, the workpiece is secured onto the base so as to tightly contact the locator.

However, the device requires that the nuts be removed from the bolts under the base and that the bolts be extracted from the base when the locator is to be moved. Additionally, the device has a low cutting accuracy because the device does not have a positioning means. Furthermore, since the locator has a large curved front central portion concave backward to prevent the locator from interfering with the circular saw, the cut chips of the workpiece are ejected outwardly, thereby posing a safety risk to the operator and nearby equipment.

SUMMARY OF THE INVENTION

The present invention was designed to eliminate the above-mentioned and other troubles, drawbacks and disadvantages.

Accordingly, it is an object of the present invention to provide a first circular saw device having a variable cut-off angle and a locator which can be easily and accurately moved to either a forward position or a backward position on a base depending on the cross-sectional size of a workpiece, and which can be easily and accurately placed and secured in each of the forward or backward positions and which minimizes the cut chips of the workpiece which are ejected from the device. A rotary table is provided on the base so that the table can be turned. A rotatable circular saw is provided on the rotary table so as to be movable upwardly and downwardly. A locator, provided on the base, has a curved front central portion concave backward so that the locator does not interfere with the circular saw when the saw is moved downwardly for cutting the workpiece. The locator is placed in the backward position near the rear edge of the base when a workpiece to be cut has a large cross-section. The locator is placed in the forward position at a prescribed distance from the backward position when the workpiece to be cut has a small cross-section. Fitted members are provided in the bottom of the locator and are slidably and securely fitted in slender guide holes of the base so that the members are slidable in the holes to move the locator from the backward position to the forward position. Pins are provided in the locator and removably fitted in the small holes of the base to place the locator in either of the forward or backward positions.

It is another object of the present invention to provide a second circular saw device having a variable cut-off angle and a locator which can be easily and accurately moved to either a forward position or a backward position on a base depending on the cross-sectional size of a workpiece, and which can be easily and accurately placed and secured in each of the forward or backward positions, and which minimizes the safety hazard posed by the cut chips of the workpiece being ejected. A rotary table is provided on the base so that the table can be turned, and a circular saw is movable upwardly and downwardly. The locator, provided on the base, has a curved front central portion concave backward so that the locator does not interfere with the circular saw moved downwardly for a cutting operation. The locator is secured in the backward position near the rear edge of the base when the workpiece to be cut has a large cross-sectional size. The locator is secured in the forward position at a prescribed distance from the backward position when the workpiece to be cut has a small cross-sectional size. Fitted members, provided in the bottom of the locator, are fitted in the slender guide holes of the base so that the members are slidable in the holes to move the locator from the backward position to the forward position. Pins are provided in the locator and are removably fitted in the small holes of the base to place the locator in either of the forward or backward positions. Nuts are engaged on the tapped lower portions of the fitted members so that the locator can be secured to the base.

It is yet another object of the present invention to provide a third circular saw device having a variable cut-off angle and a locator can be easily and accurately moved to either a forward or a backward position on a base depending on the cross-sectional size of a workpiece, and which can be easily and accurately placed and secured in each of the positions on the base, and which serves to minimize the safety hazards posed by the cut chips of the workpiece being ejected from the device. A rotary table is provided on the base so that the table can be turned. A rotatable circular saw, provided on the table, is movable upwardly and downwardly. The locator, also provided on the base, has a curved front central portion concave backward so that the locator does not interfere with the circular saw when the saw is moved downwardly to cut a workpiece. The locator is secured in the backward position near the rear edge of the base when the workpiece to be cut has a large cross-sectional size. The locator is secured in the forward position at a prescribed distance from the backward position when the workpiece to be cut has a small cross-sectional size. Fitted members, provided in the bottom of the locator, are slidably and securely fitted in the slender guide holes of the base so that the members are slidable in the holes to move the locator from the backward position to the forward position. Bolts, having pins at the bottom of the bolts, are provided in the locator so as to place and secure the locator in either of the forward or backward positions. The threaded portions of the bolts are engaged in the tapped holes of the base and pins are removably fitted in small holes provided at the bottom of the tapped holes.

The first, second, and third circular saw devices, according to the invention, each having a variable cut-off angle, are similar to each other with regard to operation thereof except for the movement of the locator, as described hereinafter. When the workpiece is to be cut by the device, the workpiece is secured on the base and placed in tight contact with the locator and the circular saw is moved downwardly for cut-off. When the workpiece is to be cut at a horizontally oblique angle such as at a miter joint or the like, the rotary table is horizontally turned to a desired azimuthal angle and the circular saw is moved downwardly to cut the workpiece. When the workpiece is to be cut at a vertically oblique angle such as when the device is a combined oblique cut-off saw device, the circular saw is vertically swung to a desired elevational angle, and the locator is moved forwardly or backwardly, depending on the cross-sectional size of the workpiece, and is secured in position to place the cross-section of the workpiece to be cut within the cut-off range by the circular saw. Thereafter, the saw is moved downwardly to cut the workpiece.

As described hereinafter, the first, second, and third circular saw devices differ from each other with regard to the locator movement. Regarding the first circular saw device, the fitted members are slidably and securely fitted in the slender guide holes of the base so that a locator securing means is unnecessary. Thus, if the pins are extracted from the small holes of the base, the locator can be moved backwardly and forwardly manually. Upon movement of the locator, the fitted members are slid into the slender guide holes so that the locator is surely positioned into the forward position or the backward position, and the pins can be precisely inserted into the other small holes of the base to accurately position the locator.

Regarding the second circular saw device, if the nuts are loosened and the pins are extracted from the small holes of the base, the locator can be moved backwardly and forwardly manually. As the locator moves, the fitted members are slid in the slender guide holes so that the locator is surely positioned into the forward or backward position, and the pins can be precisely inserted into the other small holes of the base to accurately position the locator. After the locator has been moved, the nuts are tightened to securely position the locator accurately.

Regarding the third circular saw device, if the bolts having the pins are disengaged from the tapped holes of the base and the pins are extracted from the small holes of the base and placed above the tapped holes, the locator can be moved backwardly and forwardly manually. As the locator moves, the fitted members are slid into the slender guide holes of the base so that the locator is surely positioned in the forward or the backward position, and the bolts having the pins can be precisely inserted into the other tapped holes and the other small holes concentric thereto. After the locator has been moved, the bolts are engaged in the tapped holes and the pins are fitted into the small holes to securely and accurately position the locator.

Thus, the locator can be easily and accurately positioned in either the forward position or the backward position to cut the workpiece with high accuracy by each of the first, second, and third circular saw devices. The locator may be provided with a pair of cut chip ejection prevention walls on the curved front central portion of the locator at both ends thereof so that the locator can be appropriately placed and secured so as not to interfere with the circular saw's operation, and so that the distance between the walls is much smaller than that in a conventional saw device. This makes it unlikely for the cut chips of the workpiece to be ejected, and thereby create a safety hazard.

BRIEF DESCRIPTION OF THE DRAWINGS

The above-mentioned and other objects of the present invention as well as the novel features thereof will be apparent from the detailed description herein when taken in conjunction with the drawings attached hereto in which:

FIG. 6 is a vertical sectional view of the device along a line VI—VI shown in FIG. 5; and FIG. 7 is a vertical sectional view of a major part of a circular saw device having a variable cut-off angle and which is a second embodiment of the present invention.

FIG. 8 is a vertical sectional view of a major part of a circular saw device having a variable cut-off angle and which is a third embodiment of the present invention.

DETAILED DESCRIPTION OF EXEMPLARY EMBODIMENTS

Embodiments of the present invention are hereafter described in detail with reference to the drawings attached hereto.

Figure 1:
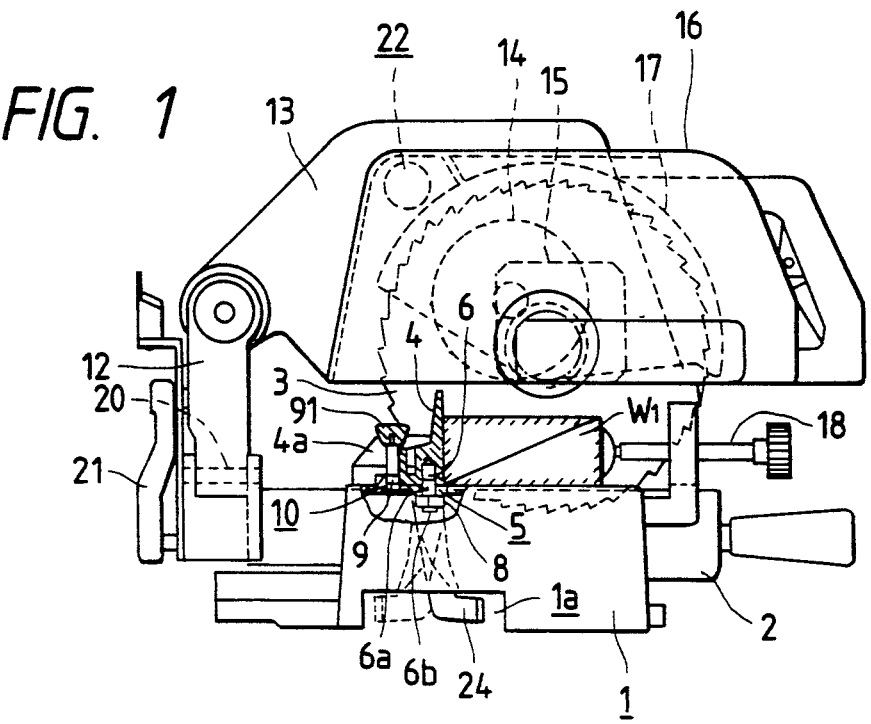
FIG. 1 is a right-hand side view of a circular saw device having a variable cut-off angle and which is an embodiment of the present invention, and illustrates a locator secured in a backward position so as to cut a workpiece having a large cross-sectional size.

FIGS. 1 and 6 show a circular saw device having a variable cut-off angle and which is one of the embodiments. A rotary table 2 is provided on the central portion of a base 1 so that the table can be turned. Base 1 has right and left cut-out portions 1a for accommodating wrenches 24, as described in more detail below. A hinge 12 is provided on the rear portion of the rotary table 2, and a bracket 13 is attached to the hinge 12 so that the bracket can be moved upwardly and downwardly. A motor 14, a speed reducer 15, a circular saw 3, an outer cover 16 and a safety cover 17 are attached to the bracket 13. A locator 4 is attached to the rear portion of the base 1, and clampers 18 are attached to the right and left portions of the front of the base 1 so that a workpiece (e.g., lumber) can be held between the locator 4 and the clampers 18. The workpiece is cut off by the circular saw 3 as the saw is moved downwardly into the slot 19 of the rotary table 2. The table 2 can be horizontally turned to change the azimuthal angle at which the workpiece is cut. The hinge 12 can be vertically turned rightwardly and leftwardly about a pin 20 to change the elevational cutting angle of the workpiece, and can be secured in an optional rightward or leftward oblique position by clamping the hinge 12 with a clamp lever 21 and bolts.

The outer cover 16 is integrated with the bracket 13, and covers the upper portion of the circular saw 3. The safety cover 17 covers the lower portion of the circular saw 3 when the saw is in a moved-up position. The safety cover 17 is swung above the front end of the outer cover 16 and into the outer cover by a linkage as the circular saw 3 is moved downwardly, so that the lower portion of the saw is uncovered, thereby allowing the saw to cut the workpiece. The cut chips of the workpiece are ejected inside the rear end of the outer cover 16, and then proceed through the cut chip blow-off port 22 of the upper rear portion of the outer cover 16, and a cut chip ejection tube 23 provided in the bracket 13, so that the chips are collected in an air-permeable bag H (not shown) attached to the tube.

The locator 4 has a curved front central portion 4a which is on the base 1 and which is concave backward so that the locator does not interfere with the saw 3 moved downwardly to cut the workpiece.

Figure 2:
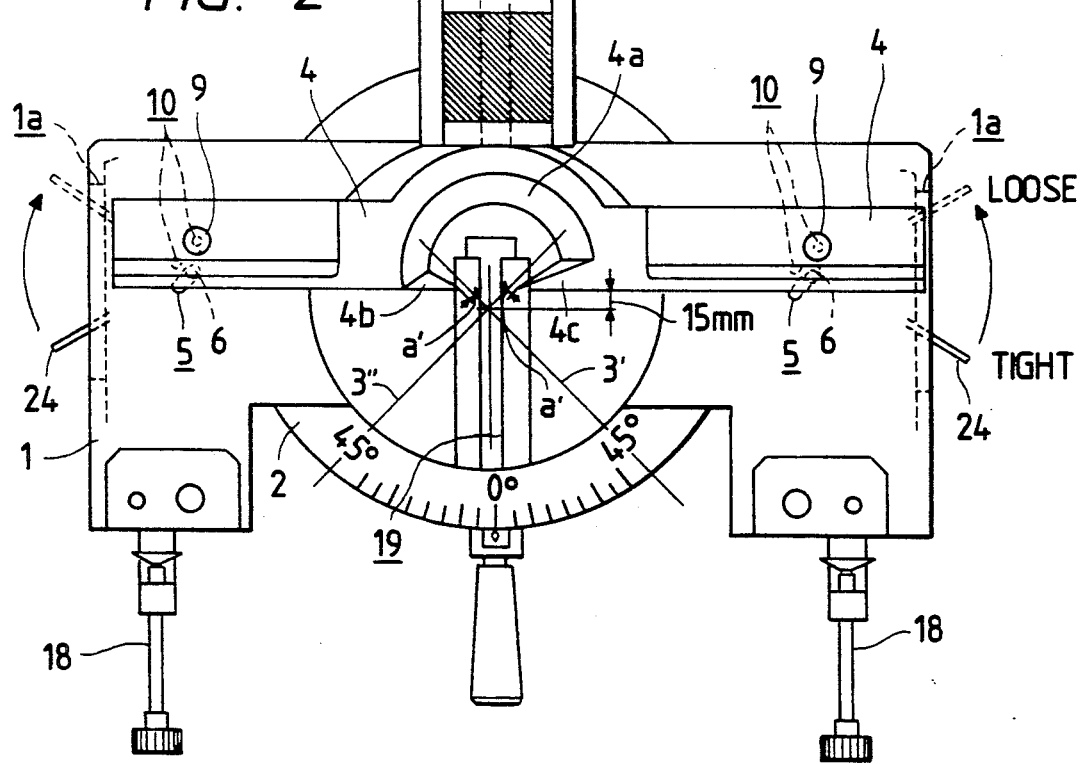
FIG. 2 is plan view of the device in the state of FIG. 1.

The locator 4 is movable backwardly or forwardly depending on the cross-sectional size of the workpiece to increase the possible cut-off range thereof. If a workpiece w1 having a large cross-sectional size is to be cut by the device, the locator 4 is moved backwardly and secured to the base 1 by the locator securing means which includes stud bolts 6 and nuts 8, and the workpiece is held on the base and tightly contacts the locator. Thereafter, as shown in FIGS. 1 and 2, the circular saw 3 is moved downwardly to cut the workpiece.

Figure 3:
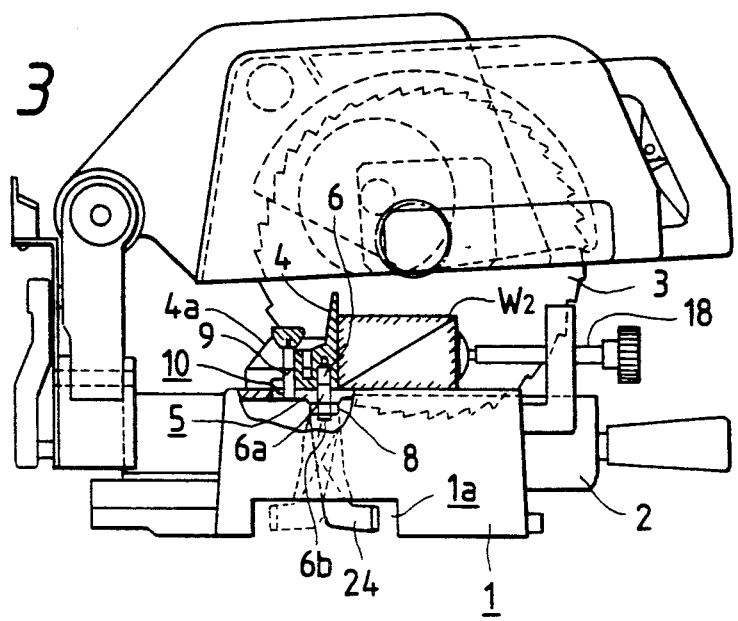
FIG. 3 is a right-hand side view of the device having the locator secured in a forward position so as to make it possible to cut a workpiece having a small cross-sectional size.
Figure 4:
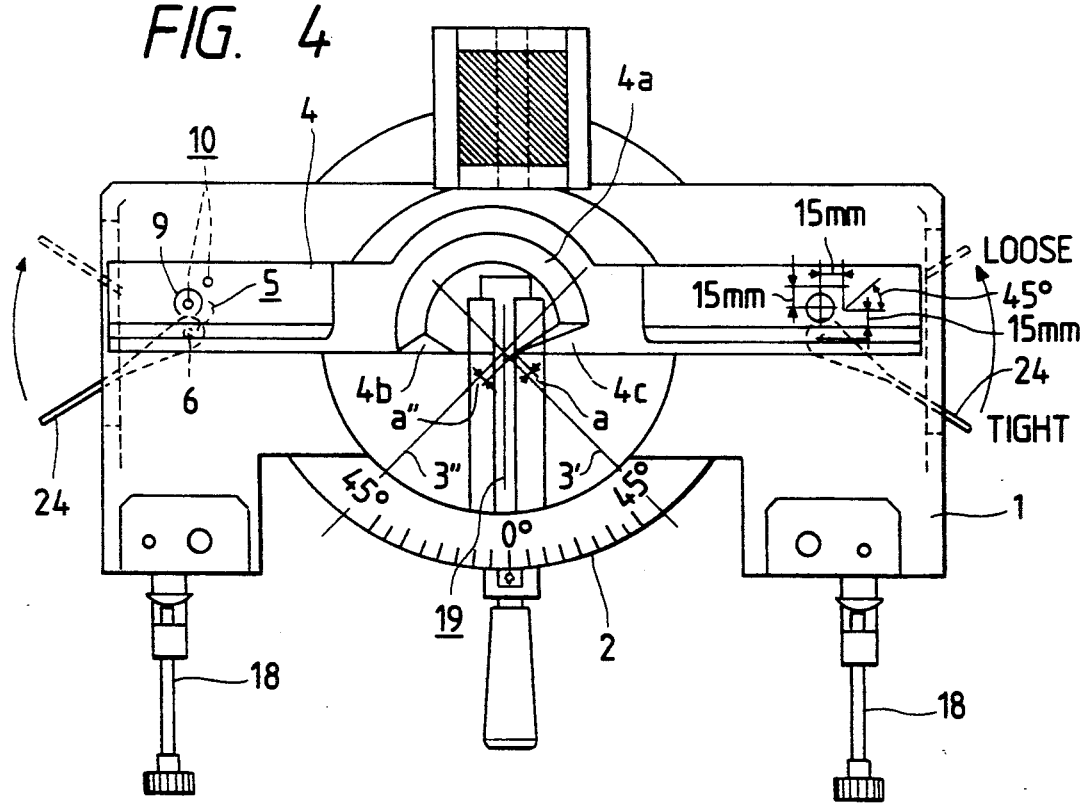
FIG. 4 is a plan view of the device in the state of FIG. 3.

Referring to FIGS. 3 and 4, if a workpiece w2 having a small cross-sectional size is to be cut by the device, the locator 4 is moved forwardly and secured to the base 1 by the locator securing means so as to make the center of curvature of the curved front central portion 4a of the locator coincident with that of the rotation of the rotary table 2. The workpiece is held on the base and tightly contacts the locator, and the circular saw 3 is moved downwardly to cut the workpiece.

The diameter of the circular saw 3 is 10 inches (254 mm). When the locator 4 is secured in the forward position thereof to make the center of curvature of the curved front central portion 4a coincident with that of the rotation of table 2, as shown in FIGS. 3 and 4, and the workpiece w2 has a cross-sectional size of 1.5 inches (38.1 mm) by 3.5 inches (88.9 mm) (generally referred to as a 2-by-4), the cross-section can be placed within the possible cut-off range by the saw so as to be cut thereby, whether the cross-section slenderly extends vertically or horizontally. When the locator 4 is secured in a backward position thereof at a distance of 15 mm from the forward position, as shown in FIGS. 1 and 2 (generally referred to as a 2-by-6), and the workpiece w1 has a cross-section of 1.5 inches (38.1 mm) by 5.5 inches (139.7 mm), the cross-section can be placed within the possible cut-off range by the saw 3 so as to be cut thereby, even if the cross-section slenderly extends horizontally. The locator 4 can be moved to and from each of the forward and backward positions while being guided by pairs of guide means which include slender holes 5 and the stud bolts 6 (which are fitted members).

To move the locator 4 from the backward position to the forward position, the stud bolts 6, shown in FIG. 6 and provided in the bottom of the locator 4 and extending through the slender holes 5 of the base 1, are slid in the holes 5 at the intermediate unthreaded portions 6a of the bolts. To secure the locator 4 to the base 1, the nuts 8 engage the lower threaded portions 6b of the bolts 6 and are tightened thereon. Thus, the locator 4 can be moved backwardly and forwardly without removing the stud bolts 6 and the nuts 8 which constitute the locator securing means, and the number of device components is minimized to simplify the assembly thereof. The stud bolts 6 not only constitute parts of the locator securing means, but also serve as fitted members slidably fitted in the slender holes 5.

To position the locator 4, pins 9 provided in the locator 4 are removably fitted in small holes 10 of the base 1. The front and rear parts of each of the right and left portions of the base 1 have two of the small holes 10 corresponding to the ends of the strokes of the pins 9, which are moved together with the locator 4. Thus, the locator can be accurately positioned in each of the forward and backward positions by fitting the pins 9 in the small holes 10. When pin knobs 91 provided on the tips of the pins 9 are lifted against the urging forces of helical springs 92, the pins 9 are extracted from the small holes 10. Thereafter, when the knobs 91 are released, the pins 9 are fitted into the small holes 10 by the urging forces of the springs 92. Thus, the pins 9 are easily positioned into and out of the small holes 10.

Figure 5:
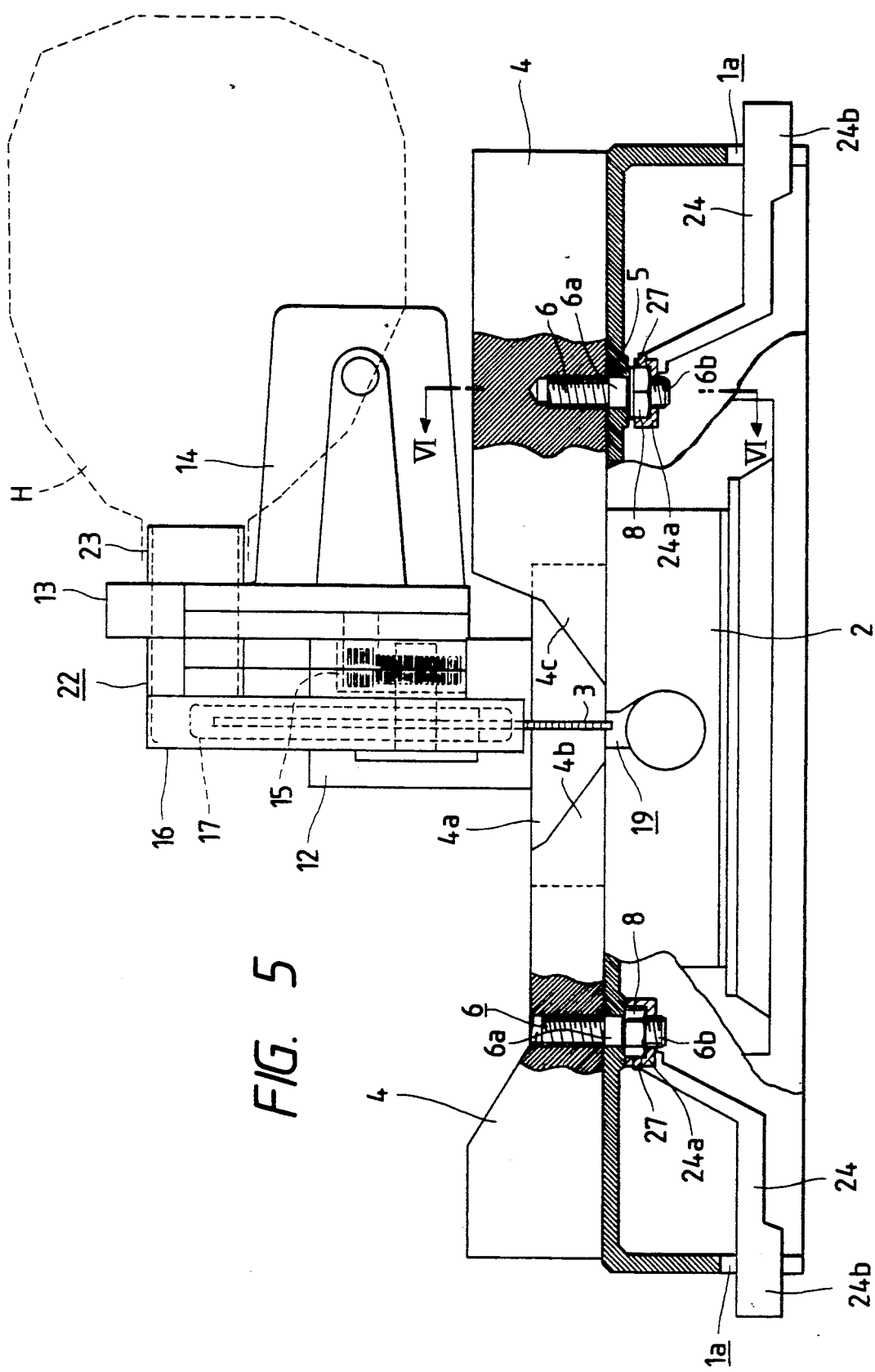
FIG. 5 is a cut-away front view of the device.

As shown in FIGS. 2, 4 and 5, wrenches 24 for either tightening or loosening the nuts 8 by a one-step operation are preferably provided under the right and left portions 10 of the base 1. The nut-fitted portions 24a of the wrenches 24 are fitted on the nuts 8 and secured thereto by screws 27. The handles 24b of the wrenches 24 project out of the openings 1a of the right and left sides of the base 1 so that the nuts 8 can be either tightened or loosened by swinging the handles 24b. Thus, the nuts 8, provided under the base 1 to secure the locator 4 thereto, are tightened and loosened in a one-step operation so as that the locator is easily fastened and unfastened to and from the base. This results in efficient use of the circular saw device.

Since the wrenches 24 are coupled to the locator 4 through the stud bolts 6, the wrenches are moved with the locator during the movement thereof. When the handles 24b of the wrenches 24 are placed forwardly as shown by the full lines in FIGS. 2 and 4, the nuts 8 are tightened to secure the locator 4 to the base 1, regardless of whether the locator coupled with the wrenches is in the backward position, as shown in FIG. 2, or in the forward position, as shown in FIG. 4. Thereafter, when the handles 24b of the wrenches 24 are swung backwardly, as shown by the dotted lines in FIGS. 2 and 4, the nuts 8 are loosened to release the locator 4 from the base 1 to allow the locator to move backwardly or forwardly, whether the locator coupled with the wrenches is in the backward position as shown in FIG. 2, or in the forward position as shown in FIG. 4.

When the locator 4 is in the backward position, as shown in FIG. 2, a cut chip ejection prevention wall 4b provided on the right end part of the curved front central portion 4a of the locator 4 is positioned so as not to interfere with the saw 3 horizontally swung leftwardly by an azimuthal angle 3' of 45 degrees and moved downwardly to cut the workpiece. Another cut chip ejection prevention wall 4c, provided on the left end part of the curved front central portion, also is positioned so as not to interfere with the saw horizontally swung rightwardly by a 45-degree angle 3" and moved downwardly to cut the workpiece.

Hence, the curved front central portion 4a of the locator 4 is provided with cut chip ejection prevention walls 4b and 4c, such that wall 4b is placed at a small distance a' from the rear portion of the right side of the saw 3 which has been horizontally swung leftwardly by the 45-degree angle 3' and moved downwardly to cut the workpiece. Therefore, portion 4a does not interfere with the saw. Wall 4c is placed at a small distance a" from the rear portion of the left side of the saw 3 horizontally swung rightwardly at the 45-degree angle 3" and moved downwardly to cut the workpiece. Therefore, wall 4c also does not interfere with the saw. This allows the locator 4 to be positioned and secured so that the curved front central portion 4a of the locator does not interfere with the saw 3 moved downwardly to cut the workpiece.

Additionally, the distance a, between the cut chip ejection prevention wall 4c and the saw is much smaller than that in conventional systems, thus minimizing the ejection of the cut chips of the workpiece into the work environment. Therefore, when the locator 4 is secured in the backward position to cut the workpiece w1 having a cross-sectional size of 1.5 inch (38.1 mm) by (5.5 inch) 139.7 mm, either the right or the left cut chip ejection prevention walls 4b and 4c is placed near the rear portion of the circular saw 3 to prevent the cut workpiece chips from being ejected backwardly, regardless of whether the saw is positioned rightwardly or leftwardly at a 45-degree angle.

When the locator 4 is moved from the backward position to the forward position (i.e., the distance therebetween being 15 mm), the locator 4 is displaced forwardly and rightwardly at a 45-degree angle so that the center of curvature of the curved front central portion 4a of the locator nearly coincides with that of the turning of the rotary table 2. To displace the locator 4 forwardly and rightwardly at the 45-degree angle from the backward position to the forward position, the right and left slender holes 5 are provided in the base 1 so that the holes are curved rightwardly by the 45-degree angle (with regard to viewing in a downward direction), and the stud bolts 6 are fitted in the holes to slide therein securely while being guided by the holes 5. As a result, even if the locator 4 is secured in the forward position as shown in FIG. 4, the cut chip ejection prevention wall 4c of the locator is placed at a small distance a' or a" from the circular saw 3 when the saw is moved downwardly to cut the workpiece, regardless of whether the saw is positioned at the 45-degree angle rightwardly or leftwardly. Thus, when the locator 4 is secured in the forward position to cut the workpiece w2, having a cross-sectional size of 1.5 inches (38.1 mm) by 3.5 inches (88.9 mm), the saw 3 is horizontally swung rightwardly by the 45-degree angle so that the cut chip ejection prevention wall 4c of the locator is placed near the rear portion of the saw to prevent the cut workpiece chips from being ejected backwardly.

FIG. 7 shows a major aspect of a circular saw device having a variable cut-off angle and which is a second embodiment of the present invention. The device is similar in constitution and operation as the above-described embodiment shown in FIGS. 1-6. The differences between the device according to the first and second embodiments are described hereinafter.

Stud bolts 6 (which are fitted members) are provided in the bottom of locator 4, and are fitted in the slender guide holes 5 of base 1. Nuts 8 are engaged with the threaded lower portions 6a of the stud bolts 6 so that the locator 4 can be moved manually. In the second embodiment of the invention, the stud bolts 6 and the nuts 8 do not constitute a mechanism for securing the locator to the base. Since the nuts 8 do not need to be loosened, it is unnecessary to provide wrenches 24 as in the first embodiment described above.

In the second embodiment, the mechanism for securing the locator 4 to the base 1 is constituted by bolts 7 having pins 7a, and tapped holes 11 provided in the base 1. The bolts 7 are positioned through the bolt holes 26 of the locator 4 so as not to rest in the holes, and are engaged in the tapped holes 11 to secure the locator 4 to the base 1. The pins 7a provided at the bottoms of the bolts 7 are fitted in small holes 10 provided at the bottoms of the tapped holes 11, so that the pins position the locator 4 relative to the base 1. The front and rear parts of each of the right and left portions 1a of the base 1 have two tapped holes 11 and two small holes 10 corresponding to the front and rear ends of the stroke of the locator 4 so that the locator can be positioned and secured in the forward and backward positions thereof.

Springs 25 are provided to push the pins 7a of the bolts 7 above the tapped holes 11 when the bolts are disengaged from the tapped holes. The springs 25 also prevent the bolts from loosening after being tightened in the tapped holes, thereby to secure the locator 4 to the base 1.

In both the first and second embodiments, the locator can be moved at a 45-degree angle forwardly and backwardly, the distance between the forward and backward positions of the locator is set at approximately 15 mm, and the center of curvature of the curved front central position of the locator in the forward position coincides with that of the turning of rotary table 2. Since wrenches 24 are not required in the second embodiment, it is easier to move and assemble the locator 4 than in the above-described first embodiment.

FIG. 8 shows a major aspect of a circular saw device having a variable cut-off angle and which is a third embodiment of the present invention. The device is similar in constitution and operation as the above-described embodiment shown in FIGS. 1-6. The differences between the device according to the first and third embodiments are described hereinafter.

Bolts 106 having head portions 106a (which are fitted members) are provided in the bottom of the locator 4, and are slidably fitted in the slender guide holes 5 of the base 1. The wrenches 24 have head-fitted portions 124a instead of a nut-fitted portions 24a of the first embodiment. The head-fitted portions 124a of the wrenches 124 are fitted and secured to the head portions 106a of the bolts 106.

The present invention is not confined to the embodiments described above, but may be embodied or practiced in other various ways without departing from the spirit or essential character thereof. Thus, the scope of the invention should be considered as limited only by the appended claims.

What is claimed is:

1. A circular saw device having a variable cutoff angle, comprising:
   a base having guide holes and small holes therein;
   a rotary table provided on said base;
   a rotatable circular saw mounted on said table to be movable upwardly and downwardly;
   a locator having a bottom provided on said base so that said locator does not interfere with said saw when said saw moves downwardly, said locator being movable between a first and a second position;
   fitted members, provided in said bottom of said locator, being securely and slidably fitted in said guide holes of said base so that said fitted members are slidable in said guide holes to move said locator from said first position to said second position; and
   pins provided in said locator and being removably fitted in said small holes of said base to place said locator in one of said first and second positions.

2. A circular saw device according to claim 1, wherein said locator is selectively moveable to one of said first position and said second position dependent upon a workpiece having a cross-sectional size larger or smaller, respectively, than a predetermined cross-section.

3. A circular saw device according to claim 1, wherein said locator has a curved front central portion concave backward so as not to interfere with said saw when said saw moves downwardly.

4. A circular saw device according to claim 1, wherein said first position is substantially on a rear edge of said base.

5. A circular saw device according to claim 1, wherein said locator has an edge surface which is brought into contact with a workpiece, said locator having a locus of movement from said first position to said second position of a predetermined distance in a direction away from said circular saw at a substantially 45-degree angle with respect to said edge surface of said locator.

6. A circular saw device according to claim 1, further comprising a cut chip ejection prevention wall coupled to said locator.

7. A circular saw device having a variable cutoff angle, comprising:
   a base having first holes and second holes therein;
   a rotary table provided on said base;
   a rotatable circular saw provided on said table to be movable upwardly and downwardly;
   a locator provided and arranged on said base so as not to interfere with said circular saw when said circular saw moves downwardly;
   fitted members having tapped lower portions and being provided in a bottom of said locator and fitted in said first holes of said base so that said fitted members are slidable in said first holes to move said locator from a first position to a second position;
   pins provided in said locator and removably fitted in said second holes of said base to place said locator in one of said first and second positions; and
   nuts engaged on said tapped lower portions of said fitted members so that said locator is securable to said base.

8. A circular saw device according to claim 7, wherein said locator has a curved front central portion concave backward so as not to interfere with said saw when said saw moves downwardly.

9. A circular saw device according to claim 7, wherein said first position is substantially on a rear edge of said base.

10. A circular saw device according to claim 7, wherein said locator is selectively moveable to one of said first position and said second position dependent upon a workpiece having a cross-sectional size larger or smaller, respectively, than a predetermined cross-section.

11. A circular saw device according to claim 7, further comprising wrenches having nut-fitted portions, said wrenches being coupled to said nuts.

12. A circular saw device according to claim 11, wherein said nut-fitted portions of said wrenches are secured to said nuts, and wherein said wrenches include handles projecting out of openings of said base so as to be swingable to implement one of tightening said locator to said base and loosening said locator from said base.

13. A circular saw device according to claim 7, wherein said locator has an edge surface which is brought into contact with a workpiece, said locator having a locus of movement from said first position to said second position of a predetermined distance in a direction away from said circular saw at a substantially 45-degree angle with respect to said edge surface of said locator.

14. A circular saw device according to claim 7, further comprising a cut chip ejection prevention wall coupled to said locator.

15. A circular saw device having a variable cutoff angle, comprising:
   a base having first holes and second holes therein;
   a rotary table provided on said base;
   a rotatable circular saw provided on said table to be movable upwardly and downwardly;
   a locator provided and arranged on said base so as not to interfere with said circular saw when said circular saw moves downwardly;
   fitted members provided in a bottom of said locator and fitted in said first holes of said base so that said fitted members are slidable in said first holes to move said locator from a first position to a second position and to secure said locator to said base; and
   pins provided in said locator and removably fitted in said second holes of said base to place said locator in one of said first and second positions.

16. A circular saw device according to claim 15, wherein said first position is substantially on a rear edge of said base.

17. A circular saw device according to claim 15, wherein said locator is selectively moveable to one of said first position and said second position dependent upon a workpiece having a cross-sectional size larger or smaller, respectively, than a predetermined cross-section.

18. A circular saw device according to claim 15, wherein each of said fitted members comprises bolts each having a head portion.

19. A circular saw device according to claim 18, further comprising wrenches having portions adapted to fit said head portions of said bolts, said wrenches being coupled to said head portions of said bolts.

20. A circular saw device according to claim 19, wherein said portions of said wrenches are secured to said head portions of bolts, and wherein said wrenches include handles projecting out of openings of said base so as to be swingable to implement one of tightening said locator to said base and loosening said locator from said base.

21. A circular saw device according to claim 15, wherein said locator has a curved front central portion concave backward so as not to interfere with said saw when said saw moves downwardly.

22. A circular saw device according to claim 15, wherein said locator has an edge surface which is brought into contact with a workpiece, said locator having a locus of movement from said first position to said second position of a predetermined distance in a direction away from said circular saw at a substantially 45-degree angle with respect to said edge surface of said locator.

23. A circular saw device according to claim 15, further comprising a cut chip ejection prevention wall coupled to said locator.

24. A circular saw device having a variable cut-off angle, comprising:
   a base having first holes and second holes therein;
   a rotary table provided on said base;
   a rotatable circular saw provided on said table to be movable upwardly and downwardly;
   a locator provided on said base so that said locator does not interfere with said saw when said saw moves downwardly, said locator being securable in a first and second position;
   fitted members provided in a bottom of said locator and being securely and slidably fitted in said first holes of said base so that said fitted members are slidable in said first holes to move said locator from said first position to said second position;
   bolts having threaded portions and being provided in said locator; and
   pins being coupled to bottoms of said bolts, wherein said locator is secured in one of said first and second positions by said threaded portions of said bolts being engaged in said second holes of said base and said pins being removably fitted in small holes provided at bottoms of said second holes.

25. A circular saw device according to claim 24, wherein said locator is selectively moveable to one of said first position and said second position dependent upon a workpiece having a cross-sectional size larger or smaller, respectively, than a predetermined cross-section.

26. A circular saw device according to claim 24, further comprising resilient members, wherein said bolts having said pins are liftable by said resilient members to extract said pins from said small holes.

27. A circular saw device according to claim 26, wherein said resilient members comprise springs and pin knobs coupled to said springs.

28. A circular saw device according to claim 24, wherein said locator has a curved front central portion concave backward so as not to interfere with said saw when said saw moves downwardly.

29. A circular saw device according to claim 24, wherein said first position is near a rear edge of said base.

30. A circular saw device according to claim 24, wherein said locator has an edge surface which is brought into contact with a workpiece, said locator having a locus of movement from said first position to said second position of a predetermined distance in a direction away from said circular saw at a substantially 45-degree angle with respect to said edge surface of said locator.

31. A circular saw device according to claim 24, further comprising a cut chip ejection prevention wall coupled to said locator.

* * * * *